(12) United States Patent
Fukuda et al.

(10) Patent No.: US 11,613,248 B2
(45) Date of Patent: Mar. 28, 2023

(54) CONTROL APPARATUS FOR HYBRID VEHICLE

(71) Applicant: Mazda Motor Corporation, Hiroshima (JP)

(72) Inventors: Yutaro Fukuda, Aki-gun (JP); Tadashi Saito, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/402,824

(22) Filed: Aug. 16, 2021

(65) Prior Publication Data

US 2022/0063593 A1 Mar. 3, 2022

(30) Foreign Application Priority Data

Sep. 1, 2020 (JP) .............................. JP2020-146637

(51) Int. Cl.
*B60W 20/40* (2016.01)
*B60K 6/48* (2007.10)
(Continued)

(52) U.S. Cl.
CPC .............. *B60W 20/40* (2013.01); *B60K 6/48* (2013.01); *B60W 10/02* (2013.01); *B60W 10/06* (2013.01);
(Continued)

(58) Field of Classification Search
CPC .... B60W 10/02; B60W 10/023; B60W 10/06; B60W 10/08; B60W 10/115; B60W 10/26; B60W 20/13; B60W 20/20; B60W 20/40; B60W 2050/0002; B60W 2510/0638; B60W 2510/081; B60W 2510/244; B60W 2520/10; B60W 2520/105; B60W 2540/10; B60W 2540/106; B60W 2540/12; B60W 2540/16; B60W 2710/021; B60W 2710/025; B60W 2710/0605;
(Continued)

(56) References Cited

U.S. PATENT DOCUMENTS 6,655,485 B1 * 12/2003 Ito ........................ B60K 6/387
903/910
9,623,867 B2 * 4/2017 Ashizawa ................ B60K 6/48
(Continued)

FOREIGN PATENT DOCUMENTS

JP 2018030507 A 3/2018

*Primary Examiner* — Carl C Staubach
(74) *Attorney, Agent, or Firm* — Alleman Hall Creasman & Tuttle LLP (57) ABSTRACT

A controller as a control apparatus for a hybrid vehicle determines whether or not to perform switching from a first traveling mode in which a hybrid vehicle is caused to travel using torque of a motor without using torque of an engine to a second traveling mode in which the hybrid vehicle is caused to travel using at least the torque of the engine. The controller, when determining that switching is to be performed from the first traveling mode to the second traveling mode, performs control to reduce output torque of the motor by a predetermined amount. After this control, the controller shifts a first clutch from a released state to an engaged state so that the torque of the motor is transmitted to the engine via the first clutch, and cranks the engine using the motor to start the engine.

14 Claims, 6 Drawing Sheets

(51) Int. Cl.
*B60W 10/02* (2006.01)
*B60W 10/06* (2006.01)
*B60W 10/08* (2006.01)
B60K 6/365 (2007.10)

(52) U.S. Cl.
CPC ............ *B60W 10/08* (2013.01); *B60K 6/365* (2013.01); *B60W 2510/244* (2013.01); *B60W 2540/10* (2013.01); *B60W 2540/12* (2013.01); *B60W 2540/16* (2013.01); *B60W 2710/021* (2013.01)

(58) Field of Classification Search
CPC ... B60W 2710/0616; B60W 2710/081; B60W 2710/083; B60W 30/182; B60W 30/192; B60W 50/082; B60K 2006/4825; B60K 6/365; B60K 6/387; B60K 6/48; B60K 6/547
See application file for complete search history.

(56) References Cited

U.S. PATENT DOCUMENTS

| | | | |
|---|---|---|---|
| 2007/0221421 A1* | 9/2007 | Tanishima | B60W 10/115 |
| | | | 180/65.245 |
| 2019/0181587 A1* | 6/2019 | Richardson | H01R 13/6683 |
| 2019/0193720 A1* | 6/2019 | Komuro | B60W 10/107 |
| 2020/0298831 A1* | 9/2020 | Nakano | B60W 10/08 |
| 2020/0377075 A1* | 12/2020 | Meyer | B60K 6/387 |
| 2021/0008971 A1* | 1/2021 | Toda | B60W 40/08 |
| 2021/0061258 A1* | 3/2021 | Saito | B60K 6/26 |
| 2022/0048495 A1* | 2/2022 | Cho | B60K 6/48 |

\* cited by examiner

CONTROL APPARATUS FOR HYBRID VEHICLE

TECHNICAL FIELD

The present disclosure relates to a control apparatus for a hybrid vehicle including an engine, a motor, and a clutch that switches between transmission and non-transmission of torque between the engine and the motor.

BACKGROUND ART

Conventionally, in a hybrid vehicle that includes an engine and a motor as power sources and that is driven by at least one of a driving force of the engine and a driving force of the motor, a technique has been proposed in which the engine is cranked by the motor to start the engine. For example, JP2018-30507A discloses a technique in which at the time of shifting from a traveling mode using torque of the motor to a traveling mode using torque of the engine and the motor, the torque of the motor is changed based on transmission torque of a clutch provided between the engine and the motor to thereby suppress occurrence of torque shock in the vehicle in association with connection of the clutch.

SUMMARY OF INVENTION

Problem to be Solved by the Invention

Conventionally, a motor (typically, a permanent magnet motor) has been widely used which has a characteristic in which as the rotation speed increases, generated torque gradually decreases. In the case where the motor having such a characteristic is used in a hybrid vehicle, at the time of switching from a traveling mode in which the hybrid vehicle is caused to travel using the torque of the motor without using the torque of the engine (hereinafter referred to as a "first traveling mode" as appropriate) to a traveling mode in which the hybrid vehicle is caused to travel using at least the torque of the engine (hereinafter referred to as a "second traveling mode" as appropriate), a relatively large deceleration may be generated in the hybrid vehicle when the engine is started. The reason for this is as follows.

In the case where the motor having the above-described characteristic is used, when the rotation speed of the motor is relatively high during the first traveling mode, torque which can be generated by the motor becomes relatively small. In the case where the torque which can be generated by the motor becomes relatively small during the first traveling mode, at the time of switching from the first traveling mode to the second traveling mode, when the engine is started by using the torque of the motor (that is, when the engine is started by performing cranking using the motor), the motor may not sufficiently generate the torque necessary for starting the engine. In this case, kinetic energy of the traveling hybrid vehicle is used to start the engine, that is, pull-in of torque from the vehicle side to the engine occurs. As a result, at the time of switching from the first traveling mode to the second traveling mode, a relatively large deceleration may be generated in association with the decrease in the kinetic energy of the hybrid vehicle, which may cause the driver discomfort.

The present disclosure has been made to solve the above-described problem of the conventional technique, and an object thereof is to provide a control apparatus for a hybrid vehicle including an engine, a motor, and a clutch provided therebetween which is capable of appropriately suppressing a sense of discomfort in a driver due to generation of deceleration at the time of switching from a traveling mode using the motor to a traveling mode using the engine.

Means for Solving the Problems

To achieve the above object, the disclosed is a control apparatus for a hybrid vehicle including an engine, a motor, and a clutch that switches between transmission and non-transmission of torque between the engine and the motor. The control apparatus includes a processor configured to execute a traveling mode determination module for determining whether or not to switch a traveling mode of the hybrid vehicle from a first traveling mode in which the clutch is set to a released state and the hybrid vehicle is caused to travel using torque of the motor without using torque of the engine to a second traveling mode in which the clutch is set to an engaged state and the hybrid vehicle is caused to travel using at least the torque of the engine; a motor control module for performing a control to reduce output torque of the motor by a predetermined amount when the traveling mode determination module determines that the traveling mode of the hybrid vehicle is to be switched from the first traveling mode to the second traveling mode; a clutch control module for shifting the clutch from the released state to the engaged state so that the torque of the motor is transmitted to the engine via the clutch after the control performed by the motor control module; and a cranking control module for cranking the engine using the motor to start the engine during and/or after the shifting performed by the clutch control module.

In the configuration described above, at the time of switching from the first traveling mode to the second traveling mode, the control apparatus for the hybrid vehicle, after performing the control to reduce the output torque of the motor by the predetermined amount, shifts the clutch from the released state to the engaged state and starts the engine by cranking the engine using the motor. That is, the control apparatus for the hybrid vehicle, at the time of switching from the first traveling mode to the second traveling mode, before the engine is started, performs the control to reduce the output torque of the motor by the predetermined amount to reduce moving-direction acceleration of the hybrid vehicle by a predetermined amount in advance.

According to the configuration described above, when the engine is started for switching of the traveling mode, even if the motor cannot sufficiently generate the torque necessary for starting the engine, it is possible to reduce an acceleration change when the moving-direction acceleration of the hybrid vehicle decreases due to deceleration corresponding to an insufficient amount of the output torque of the motor. Thus, at the time of starting the engine in association with switching from the first traveling mode to the second traveling mode, it is possible to suppress a sense of discomfort in the driver as if the hybrid vehicle were suddenly dragged backward.

In the present disclosure, preferably, when the traveling mode determination module determines that the traveling mode of the hybrid vehicle is to be switched from the first traveling mode to the second traveling mode, if an operation performed by a driver of the hybrid vehicle for movement of the hybrid vehicle is present, the motor control module does not perform the control to reduce the output torque of the motor by the predetermined amount, and if the operation is absent, the motor control module performs the control to reduce the output torque of the motor by the predetermined amount.

According to the configuration described above, even at the time of switching from the first traveling mode to the second traveling mode, if the operation performed by the driver for movement of the hybrid vehicle is present, the control to reduce the output torque of the motor by the predetermined amount is not performed, so that the engine is quickly started and the request from the driver for the movement of the hybrid vehicle can be realized appropriately.

In the present disclosure, preferably, the hybrid vehicle further includes an automatic transmission that is provided on a motive power transmitting path between the engine and the motor, and a drive wheel, and that includes a planetary gear.

In the automatic transmission including the planetary gear, inertia is large, and thus a decrease in the moving-direction acceleration at the time of switching of the traveling mode is easily generated, but by applying the control according to the configuration described above to the hybrid vehicle including such an automatic transmission, an acceleration change when the moving-direction acceleration decreases can be reduced, making it possible to suppress a sense of discomfort in the driver as if the hybrid vehicle were suddenly dragged backward.

Furthermore, a control apparatus for a hybrid vehicle according to another aspect of the present disclosure is a control apparatus for a hybrid vehicle including an engine, a motor, and a clutch that switches between transmission and non-transmission of torque between the engine and the motor. The control apparatus includes a processor configured to execute a traveling mode determination module for determining whether or not to switch a traveling mode of the hybrid vehicle from a first traveling mode in which the clutch is set to a released state and the hybrid vehicle is caused to travel using torque of the motor without using torque of the engine to a second traveling mode in which the clutch is set to an engaged state and the hybrid vehicle is caused to travel using at least the torque of the engine; a motor control module for performing a control to reduce output torque of the motor so that moving-direction acceleration of the hybrid vehicle is reduced by a predetermined amount when the traveling mode determination module determines that the traveling mode of the hybrid vehicle is to be switched from the first traveling mode to the second traveling mode; a clutch control module for shifting the clutch from the released state to the engaged state so that the torque of the motor is transmitted to the engine via the clutch after the control performed by the motor control module; and a cranking control module for cranking the engine using the motor to start the engine during and/or after the shifting performed by the clutch control module.

Advantageous Effect of Invention

According to the control apparatus for the hybrid vehicle of the present disclosure, it is possible to appropriately suppress a sense of discomfort in the driver due to generation of deceleration at the time of switching from the traveling mode using the motor to the traveling mode using the engine.

MODE FOR CARRYING OUT THE INVENTION

Hereinafter, a control apparatus for a hybrid vehicle according to an embodiment of the present disclosure will be described with reference to the attached drawings.

Configuration of Apparatus

Figure 1:
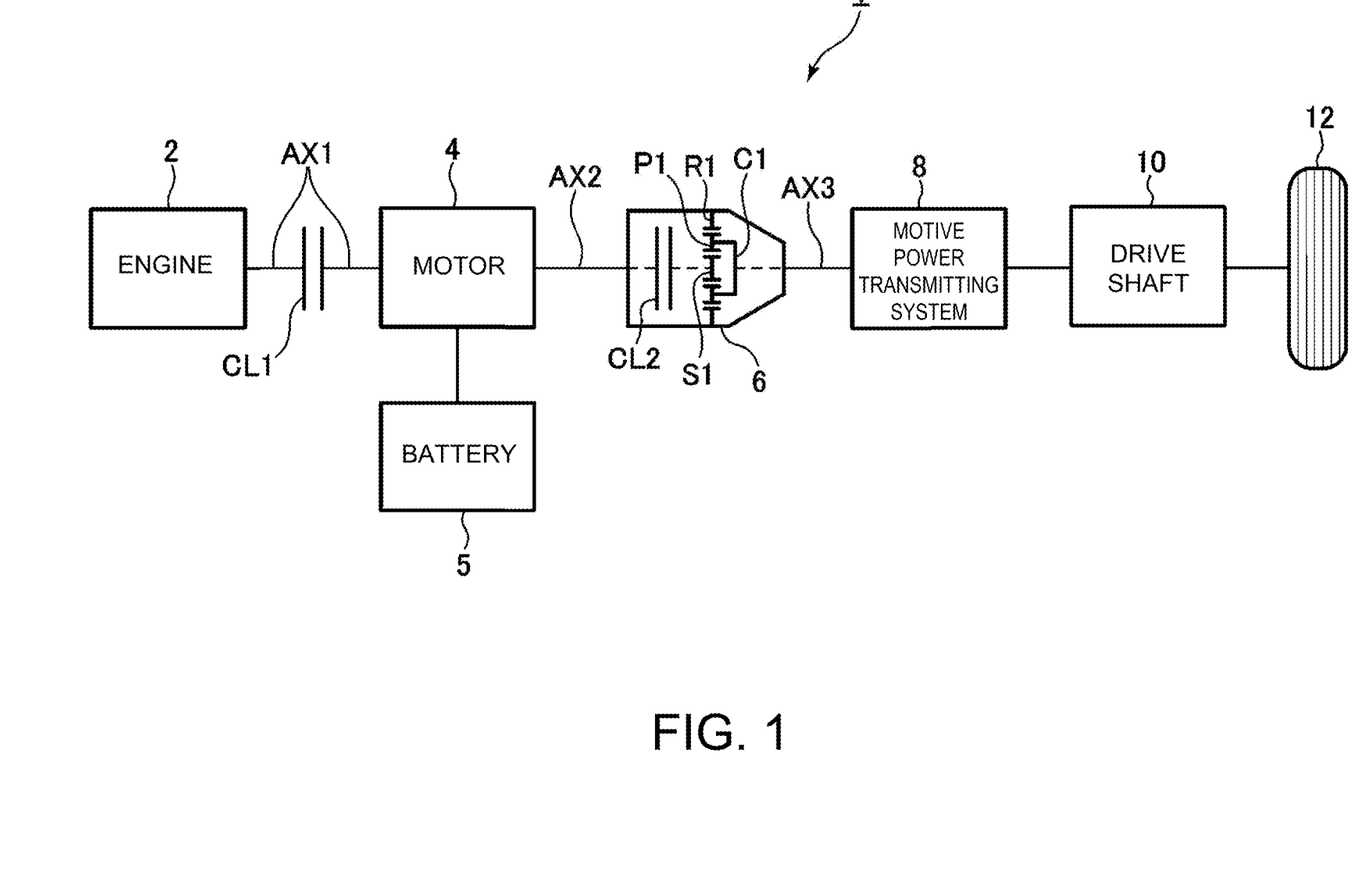
FIG. 1 is a schematic configuration view of a hybrid vehicle using a control apparatus for a hybrid vehicle according to an embodiment of the present disclosure.

FIG. 1 is a schematic configuration view of a hybrid vehicle using the control apparatus for a hybrid vehicle according to the embodiment of the present disclosure.

As illustrated in FIG. 1, a hybrid vehicle 1 mainly includes an engine 2 (for example, a gasoline engine) that generates torque for driving the hybrid vehicle 1, a motor 4 that is provided downstream of the engine 2 on a motive power transmitting path of the hybrid vehicle 1 and that generates torque for driving the hybrid vehicle 1, a battery 5 that exchanges electric power with the motor 4 via an inverter not illustrated or the like, a transmission 6 that is provided downstream of the motor 4 on the motive power transmitting path of the hybrid vehicle 1 and that changes a rotation speed of the engine 2 and/or the motor 4, a motive power transmitting system 8 that transmits torque from the transmission 6 to the downstream side, a drive shaft 10 that drives drive wheels 12 using the torque from the motive power transmitting system 8, and the drive wheels 12.

An output shaft of the engine 2 and a rotation shaft of the motor 4 are coaxially connected by a shaft AX1 via a connectable and disconnectable first clutch CL1. The first clutch CL1 enables to switch between transmission and non-transmission of torque between the engine 2 and the motor 4. For example, the first clutch CL1 is formed by a dry multi-plate clutch capable of changing a transmission torque capacity by continuously or stepwisely controlling a clutch operating oil flow rate and a clutch operating oil pressure using a motor (not illustrated).

The rotation shaft of the motor 4 and a rotation shaft of the transmission 6 are coaxially connected by a shaft AX2. Typically, the transmission 6 includes therein one or more planetary gear sets including a sun gear S1, a ring gear R1, a pinion gear P1 (planetary gear), and a carrier C1, and friction engagement elements such as a clutch and a brake, and is an automatic transmission including a function of automatically switching a gear stage (transmission gear ratio) according to a vehicle speed, an engine rotation speed, and the like. The ring gear R1 and the sun gear S1 are disposed on a concentric circle, and the pinion gear P1 is disposed between the sun gear S1 and the ring gear R1 such that the pinion gear P1 meshes with the sun gear S1 and the ring gear R1. The carrier C1 holds the pinion gear P1 such that the pinion gear P1 can rotate on its own axis and revolve around the sun gear S1. Furthermore, the transmission 6 includes therein a connectable and disconnectable second clutch CL2, and the second clutch CL2 enables to switch between transmission and non-transmission of torque between the upstream side of the transmission 6 (the engine 2 and the motor 4) and the downstream side of the transmission 6 (the drive wheels 12 and the like). For example, the second clutch CL2 is also formed by a dry multi-plate clutch capable of changing a transmission torque capacity by continuously or stepwisely controlling a clutch operating oil flow rate and a clutch operating oil pressure using a motor (not illustrated). It should be noted that in practice, the second clutch CL2 is formed by a number of clutches used to switch various gear stages in the transmission 6. Furthermore, although FIG. 1 illustrates only a single planetary gear set for simplification, in practice, the transmission 6 includes a plurality of planetary gear sets. For example, a plurality of forward shift stages and one reverse stage can be implemented by selectively engaging the friction engagement elements such as a plurality of clutches represented by the second clutch CL2 and a plurality of brakes not illustrated and switching the motive power transmitting path passing through each planetary gear set.

The motive power transmitting system 8 receives torque via an output shaft AX3 of the transmission 6. The motive power transmitting system 8 includes a differential gear that distributes a driving force to a pair of the left and right drive wheels 12, a final gear, and the like.

The hybrid vehicle 1 can switch a traveling mode by performing switching between engagement and release of the first clutch CL1. That is, the hybrid vehicle 1 has a first traveling mode in which the first clutch CL1 is set to a released state and the hybrid vehicle 1 is caused to travel using the torque of the motor 4 without using the torque of the engine 2, and a second traveling mode in which the first clutch CL1 is set to an engaged state and the hybrid vehicle 1 is caused to travel using at least the torque of the engine 2. The first traveling mode is a so-called electric vehicle (EV) traveling mode, and the second traveling mode includes an engine traveling mode in which the hybrid vehicle 1 is caused to travel using only the torque of the engine 2, and a hybrid traveling mode in which the hybrid vehicle 1 is caused to travel using both of the torque of the engine 2 and the torque of the motor 4.

The motor 4 used in the present embodiment has a characteristic that as the rotation speed increases, generated torque decreases. In other words, the motor 4 has a characteristic that as the rotation speed decreases, generated torque increases. In particular, in the motor 4, when the rotation speed is less than a predetermined value, the torque becomes almost the maximum, and when the rotation speed is greater than or equal to the predetermined value, as the rotation speed increases, the torque decreases. For example, for the motor 4 as described above, a permanent magnet motor is used.

Figure 2:
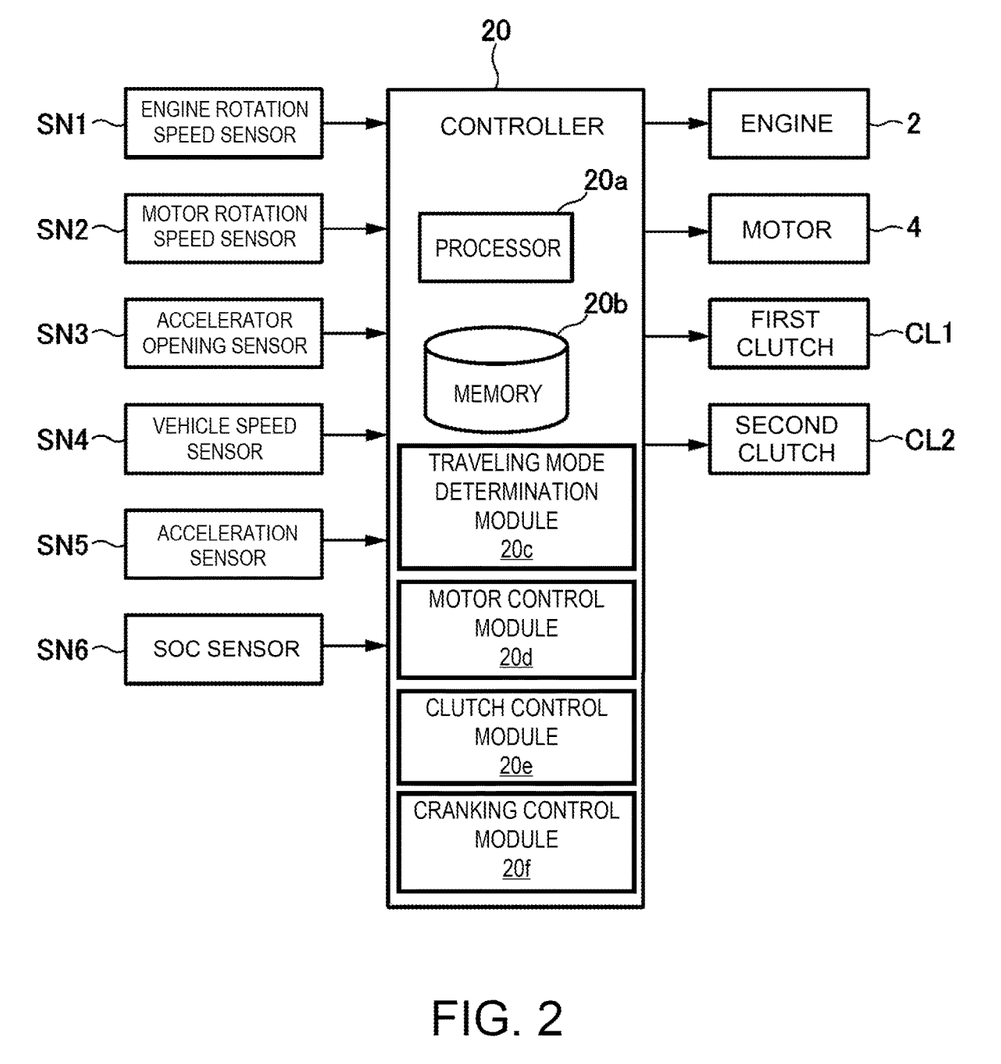
FIG. 2 is a block diagram illustrating an electrical configuration of the control apparatus for the hybrid vehicle according to the embodiment of the present disclosure.

Next, FIG. 2 is a block diagram illustrating an electrical configuration of the control apparatus for the hybrid vehicle according to the embodiment of the present disclosure.

As illustrated in FIG. 2, a controller 20 receives a signal from an engine rotation speed sensor SN1 that detects a rotation speed of the engine 2, a signal from a motor rotation speed sensor SN2 that detects a rotation speed of the motor 4, a signal from an accelerator opening sensor SN3 that detects an accelerator opening corresponding to a depression amount of an accelerator pedal caused by a driver, a signal from a vehicle speed sensor SN4 that detects a vehicle speed of the hybrid vehicle 1, a signal from an acceleration sensor SN5 that detects acceleration in the front-rear direction of the hybrid vehicle 1, and a signal from an SOC sensor SN6 that detects a state of charge (SOC) indicating a charged state of the battery 5.

The controller 20 is formed by a computer including one or more processors 20a (typically, CPU), various programs that are interpreted and executed on the processors (including a basic control program such as an operating system (OS) and an application program that is activated on the OS to implement a specific function), and memory 20b such as ROM or RAM for storing the programs and various data. The processor(s) 20a of the controller 20 executes a traveling mode determination module 20c, a motor control module 20d, a clutch control module 20e, and a cranking control module 20f to perform their respective functions and these modules are stored in the memory 20b as software. The controller 20 is an example of a "control apparatus for a hybrid vehicle" of the present disclosure.

Briefly, the traveling mode determination module 20c determines whether or not to switch the traveling mode of the hybrid vehicle 1 from the first traveling mode to the second traveling mode. The motor control module 20d controls the reduction of the output torque of the motor 4 by a predetermined amount when the traveling mode determination module 20c determines the traveling mode of the hybrid vehicle 1 is switched from the first traveling mode to the second traveling mode. The clutch control module 20e shifts the first and second clutches CL1 and CL2 from the released state to the engaged state. The cranking control module 20f cranks the engine 2 using the motor 4 to start the engine 2 during and/or after the shifting performed by the clutch control module 20e.

Specifically, the controller 20, based on detection signals from the above-described sensors SN1 to SN6, outputs control signals mainly to the engine 2, the motor 4, the first clutch CL1, and the second clutch CL2 to control these. For example, the controller 20 performs control for adjusting an ignition timing, fuel injection timing, and fuel injection amount of the engine 2, control for adjusting a rotation speed and torque of the motor 4, control for switching between engagement and release of each of the first and second clutches CL1 and CL2, and the like. It should be noted that in practice, the controller 20 controls a spark plug, a fuel injection valve, a throttle valve, and the like of the engine 2, controls the motor 4 via the inverter, and controls the first and second clutches CL1 and CL2 via a hydraulic control circuit.

Control of Hybrid Vehicle

Next, control contents performed by the controller 20 in the embodiment of the present disclosure will be described. In the present embodiment, the controller 20 performs control (engine start control) for starting the engine 2 at the time of switching from the first traveling mode (EV traveling mode) in which the hybrid vehicle 1 is caused to travel using the torque of the motor 4 to the second traveling mode (the engine traveling mode or the hybrid traveling mode) in which the hybrid vehicle 1 is caused to travel using at least the torque of the engine 2. In this case, the controller 20 controls the engine 2, the motor 4, the first clutch CL1, and the second clutch CL2 to implement the engine start control.

First, an outline of the engine start control according to the present embodiment will be described. As described above, at the time of switching from the first traveling mode to the second traveling mode, a relatively large deceleration may be generated in the hybrid vehicle 1. This is because at the time of switching from the first traveling mode to the second traveling mode, the engine 2 is started by using the torque of the motor 4 (that is, the engine 2 is started by performing cranking using the motor 4), but the motor 4 may not sufficiently generate torque necessary for starting the engine 2 (which is torque including resistance of the engine 2, variation in the first clutch CL1, and loss in the transmission 6, and the same applies to the following). In this case, kinetic energy of the traveling hybrid vehicle 1 is used to start the engine 2. As a result, in the hybrid vehicle 1, moving-direction acceleration decreases to deceleration corresponding to an insufficient amount of output torque of the motor 4 with respect to the torque necessary for starting the engine 2. When an acceleration change at this time is large, it may cause the driver discomfort as if the hybrid vehicle 1 were suddenly dragged backward.

To cope with the problem as described above, in the present embodiment, the controller 20, at the time of switching from the first traveling mode to the second traveling mode, performs control to reduce the output torque of the motor 4 by a predetermined amount, and thereafter the controller 20 shifts the first clutch CL1 from the released state to the engaged state and starts the engine 2 by cranking the engine 2 using the motor 4. That is, in the present embodiment, the controller 20, at the time of switching from the first traveling mode to the second traveling mode, before the engine 2 is started, reduces the output torque of the motor 4 by the predetermined amount.

Thus, before the engine 2 is started for switching of the traveling mode, the moving-direction acceleration of the hybrid vehicle 1 can be reduced in advance by a predetermined amount by the reduction in the output torque of the motor 4. As a result, even if the motor 4 cannot sufficiently generate the torque necessary for starting the engine 2, it is possible to reduce the acceleration change when the moving-direction acceleration decreases to the deceleration corresponding to the insufficient amount of the output torque of the motor 4. Thus, at the time of starting the engine 2 in association with switching from the first traveling mode to the second traveling mode, it becomes possible to suppress a sense of discomfort in the driver as if the hybrid vehicle 1 were suddenly dragged backward.

On the other hand, in the present embodiment, even at the time of switching from the first traveling mode to the second traveling mode, if an operation performed by the driver for movement of the hybrid vehicle 1 is present (typically, if a change amount of the accelerator opening corresponding to an operation of the accelerator pedal caused by the driver is greater than or equal to a predetermined amount), the controller 20 does not perform the control to reduce the output torque of the motor 4 by the predetermined amount as described above. In this case, the controller 20 shifts the first clutch CL1 from the released state to the engaged state without reducing the output torque of the motor 4 and starts the engine 2 by cranking the engine 2 using the motor 4. This is to quickly start the engine 2 so that responsiveness to the operation of the driver is prioritized over suppression of the acceleration change as described above.

Furthermore, in the present embodiment, even at the time of switching from the first traveling mode to the second traveling mode, if the acceleration change when the moving-direction acceleration decreases to the deceleration corresponding to the insufficient amount of the output torque of the motor 4 is less than or equal to a predetermined amount (for example, an acceleration change which does not cause the driver discomfort), the controller 20 does not perform the control to reduce the output torque of the motor 4. That is, in this case, the controller 20 also shifts the first clutch CL1 from the released state to the engaged state without reducing the output torque of the motor 4 and starts the engine 2 by cranking the engine 2 using the motor 4. For example, when the motor rotation speed is low and the motor 4 is in a state of capable of generating almost maximum torque, and accessories such as an air conditioner are in a non-operating state and torque necessary for cranking of the engine 2 can be output only by the motor 4, the controller 20, without reducing the output torque of the motor 4, starts the engine 2 by cranking the engine 2 using the motor 4. This is because in this case, since the output torque of the motor 4 does not become insufficient, the decrease in the moving-direction acceleration is not generated and the driver is not caused discomfort.

Here, in the present embodiment, when a request for switching from the first traveling mode to the second traveling mode is present in both of the cases where the output torque of the motor 4 is reduced in advance and where it is not, the controller 20 first performs control for shifting the second clutch CL2 from an engaged state to a slip state. The reason why the second clutch CL2 is thus brought into the slip state is to, in starting the engine 2, suppress the decrease in the moving-direction acceleration as much as possible due to transmission of the kinetic energy of the traveling hybrid vehicle 1 to the engine 2 side and its use for starting the engine 2.

When the second clutch CL2 is in a completely released state, it is possible to reliably suppress transmission of the kinetic energy of the hybrid vehicle 1 to the engine 2 side. However, when the second clutch CL2 is once set to the completely released state as described above, it takes time to switch the second clutch CL2 to the engaged state after this, which makes it impossible to rapidly perform switching of the traveling mode. Accordingly, in the present embodiment, when the request for switching from the first traveling mode to the second traveling mode is present, the second clutch CL2 is set to the slip state. It should be noted that the second clutch CL2 is completely engaged after ignition of the engine 2.

However, even when the second clutch CL2 is set to the slip state, the decrease in the moving-direction acceleration of the hybrid vehicle 1 is generated due to inertia of the second clutch CL2. Specifically, when torque is transmitted to some extent to the second clutch CL2 in the slip state, not in the completely released state, the kinetic energy of the hybrid vehicle 1 is used for increasing the revolution speed of the planetary gear in the transmission 6, and the moving-direction acceleration decreases.

In contrast, in the present embodiment, the controller 20, at the time of switching from the first traveling mode to the second traveling mode, before the engine 2 is started, reduces the output torque of the motor 4 by the predetermined amount in advance to reduce the moving-direction acceleration of the hybrid vehicle 1 by the predetermined amount in advance. As a result, even if the motor 4 cannot sufficiently generate the torque necessary for starting the engine 2 and increasing the revolution speed of the planetary gear in the transmission 6, it is possible to reduce the acceleration change when the moving-direction acceleration decreases to the deceleration corresponding to the insufficient amount of the output torque of the motor 4. Thus, at the time of switching from the first traveling mode to the second traveling mode, it becomes possible to suppress a sense of discomfort in the driver as if the hybrid vehicle 1 were suddenly dragged backward.

Figure 3:
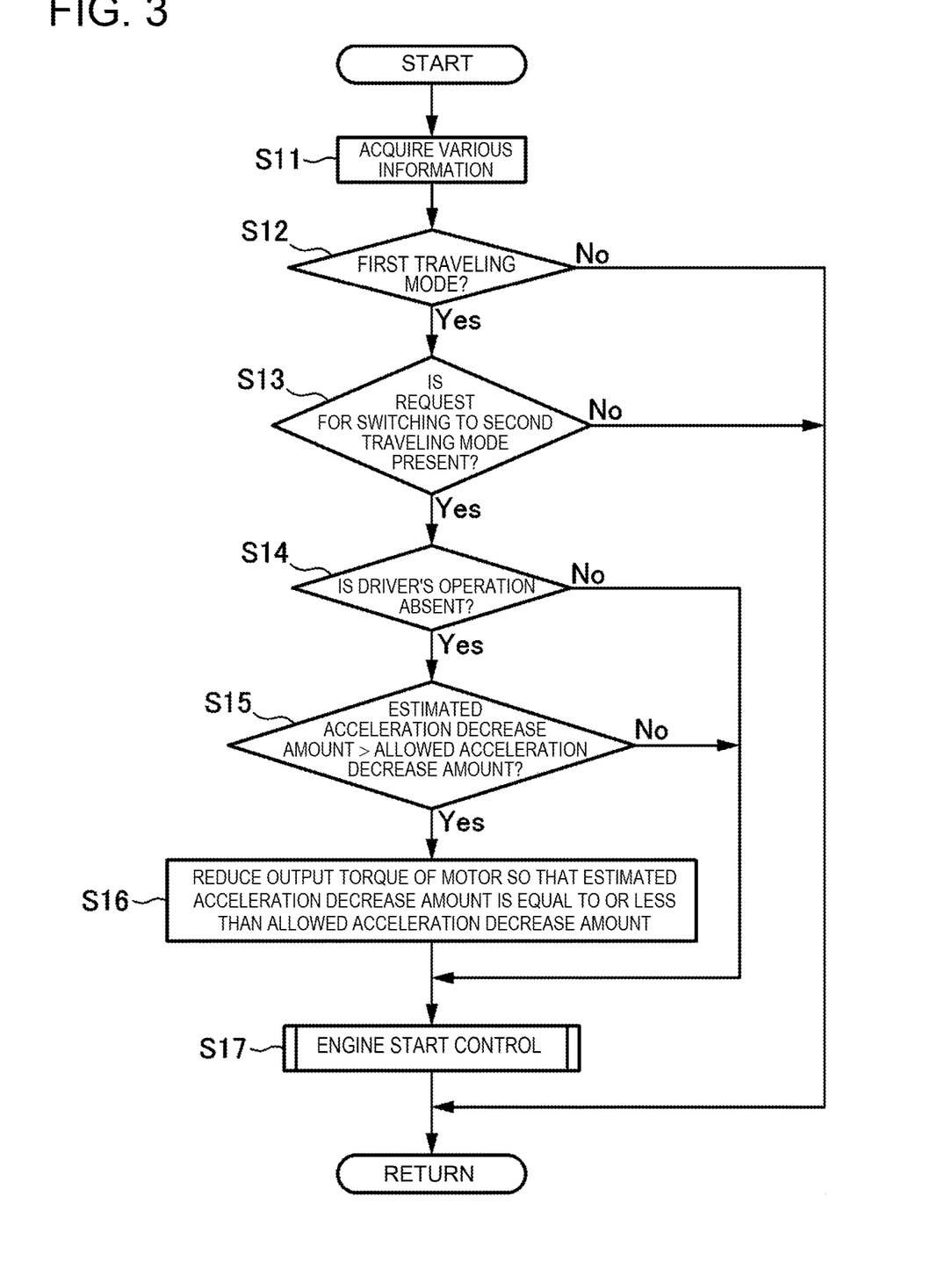
FIG. 3 is a flowchart illustrating traveling mode switching control of the hybrid vehicle according to the embodiment of the present disclosure.
Figure 4:
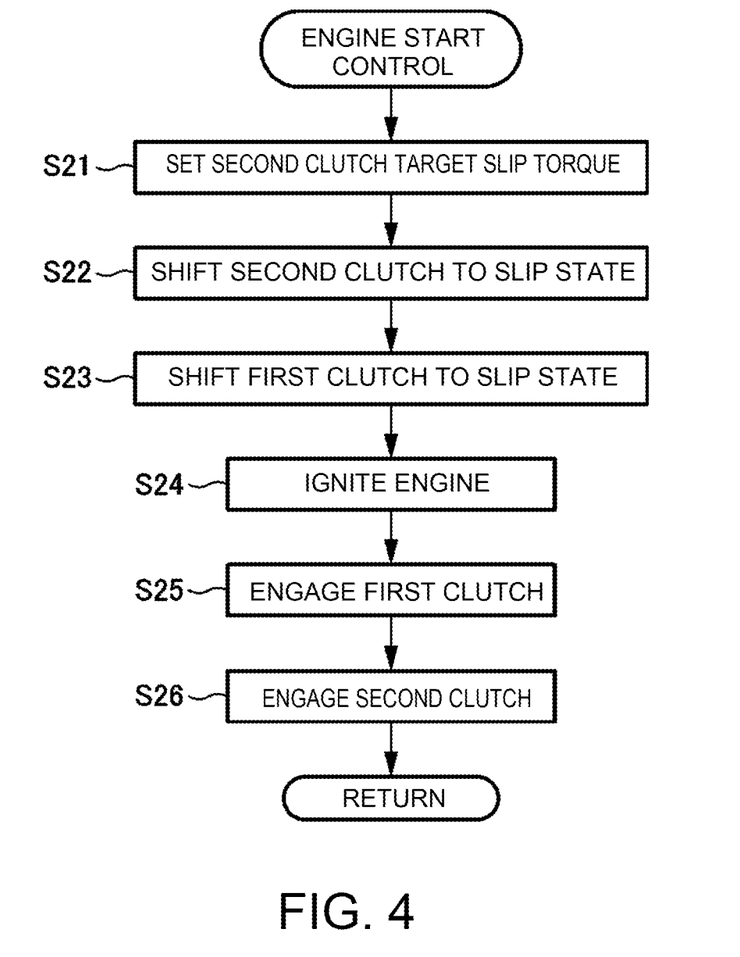
FIG. 4 is a flowchart illustrating engine start control according to the embodiment of the present disclosure.

Next, traveling mode switching control according to the embodiment of the present disclosure will be described in detail with reference to FIGS. 3 and 4. FIG. 3 is a flowchart illustrating the traveling mode switching control of the hybrid vehicle 1 according to the embodiment of the present disclosure. The traveling mode switching control is processing for switching the traveling mode from the first traveling mode to the second traveling mode and is repeatedly executed by the controller 20 at a predetermined cycle. FIG. 4 is a flowchart illustrating the engine start control according to the embodiment of the present disclosure which is executed in the traveling mode switching control.

First, when the traveling mode switching control illustrated in FIG. 3 is started, in step S11, the controller 20 acquires various information of the hybrid vehicle 1, including information corresponding to the detection signals from the above-described sensors SN1 to SN6. Then, the controller 20 proceeds to step S12.

In step S12, the controller 20 determines whether or not the current traveling mode is the first traveling mode (EV traveling mode). For example, the controller 20 makes the determination based on the control signals output to the motor 4, the first clutch CL1, and the second clutch CL2. In this example, when the first clutch CL1 is released, the second clutch CL2 is engaged, and the torque is output from the motor 4, the controller 20 determines that the current traveling mode is the first traveling mode. The controller 20, when determining that the current traveling mode is the first traveling mode (Yes in step S12), proceeds to step S13. In contrast, when the controller 20 determines that the current traveling mode is not the first traveling mode (No in step S12), typically, when the current traveling mode is the second traveling mode, the controller 20 ends the traveling mode switching control. In this case, the engine 2 is in an operational state, and thus it is not necessary to start the engine 2 by executing the engine start control.

In step S13, the controller 20 determines whether or not a request for switching from the first traveling mode to the second traveling mode is present, in other words, determines whether or not a request for starting the engine 2 is present. As one example, the controller 20 determines that the request for switching to the second traveling mode is present, when the SOC of the battery 5 detected by the SOC sensor SN6 is less than a predetermined value (for example, a lower limit value of the SOC at which charging of the battery 5 should be executed, or the SOC at which the electric power of the battery 5 is prohibited from being brought out, which are defined from the viewpoint of protection of the battery 5, and the like). As another example, the controller 20 determines that the request for switching to the second traveling mode is present, when an air conditioner switch of the hybrid vehicle 1 is turned on by the driver. As still another example, the controller 20 determines that the request for switching to the second traveling mode is present, when a relatively large accelerating request from the driver is present (for example, when the accelerator pedal is greatly depressed by the driver). The controller 20, when determining that the request for switching from the first traveling mode to the second traveling mode is present (Yes in step S13), proceeds to step S14. In contrast, the controller 20, when determining that the request for switching from the first traveling mode to the second traveling mode is absent (No in step S13), ends the traveling mode switching control. In this case, the first traveling mode is maintained, and thus it is not necessary to start the engine 2 by executing the engine start control.

In step S14, the controller 20 determines whether or not an operation performed by the driver for movement of the hybrid vehicle 1 is present. As one example, the controller 20 determines that the operation for movement of the hybrid vehicle 1 is present, when the change amount of the accelerator opening detected by the accelerator opening sensor SN3 is greater than or equal to a predetermined amount. As another example, the controller 20 determines that the operation for movement of the hybrid vehicle 1 is present, when an operation of a brake pedal is detected by a brake pedal sensor (not illustrated), when a gear-shifting instruction operation through a shift lever or a paddle shift is detected, when a steering wheel is operated, when a sport mode switch is operated, or the like. As still another example, when a sport mode is turned on by the sport mode switch, it is determined that high responsiveness is always required by the driver, and it is determined that the operation for movement of the hybrid vehicle 1 is present. The controller 20, when determining that the operation performed by the driver for movement of the hybrid vehicle 1 is present (No in step S14), proceeds to step S17 to execute the engine start control. In this case, to quickly start the engine 2 and prioritize the request from the driver, the controller 20 executes the engine start control without reducing the output torque of the motor 4 in advance. In contrast, the controller 20, when determining that the operation performed by the driver for movement of the hybrid vehicle 1 is absent (Yes in step S14), proceeds to step S15.

In step S15, the controller 20 determines whether or not an estimated decrease amount of the moving-direction acceleration of the hybrid vehicle 1 when the engine start control is executed (estimated acceleration decrease amount) is larger than a maximum allowed value of the decrease amount of the moving-direction acceleration (allowed acceleration decrease amount).

The allowed acceleration decrease amount is a maximum value of the decrease amount of the moving-direction acceleration which is allowed during the engine start control. Specifically, the allowed acceleration decrease amount is determined in advance based on a range of the acceleration decrease amount in which the driver is not caused discomfort, or a range of the acceleration decrease amount which is required in terms of reliability of the hybrid vehicle 1. In the present embodiment, the allowed acceleration decrease amount is, for example, 0.02 G. Furthermore, the estimated acceleration decrease amount can be calculated as a difference between current acceleration and estimated deceleration estimated to be generated in the hybrid vehicle 1 when the engine start control is executed. The estimated deceleration can be calculated in a manner in which torque balance obtained by subtracting torque necessary for start of the engine 2 and torque necessary for canceling traveling resistance from torque which can be output by the motor 4 is multiplied by a predetermined coefficient. The predetermined coefficient is determined based on the current gear stage of the transmission 6, the tire diameter, the weight of the hybrid vehicle 1, and the like. In the present embodiment, for convenience, a torque balance of 10 Nm corresponds to an acceleration of 0.01 G of the hybrid vehicle 1. That is, for example, when the torque balance is −15 Nm, the estimated deceleration is −0.015 G. Furthermore, the controller 20 refers to a map representing a relationship between the rotation speed of the motor 4 and the torque which can be output (stored in the memory 20b of the controller 20 in advance), so that it is possible to obtain the torque which can be output by the motor 4 based on the rotation speed of the motor 4 detected by the motor rotation speed sensor SN2. Furthermore, although in the present embodiment, for convenience, the torque necessary for starting the engine 2 is set to 90 Nm and the torque necessary for canceling the traveling resistance is set to 10 Nm, these values can be appropriately set according to the configuration of the engine 2 of the hybrid vehicle 1, the vehicle speed, and the like.

The controller 20, when determining that the estimated acceleration decrease amount is less than or equal to the allowed acceleration decrease amount (No in step S15), proceeds to step S17 to execute the engine start control. In this case, even when the engine start control is executed immediately, it is considered that the driver is caused discomfort, and thus the controller 20 executes the engine start control without reducing the output torque of the motor 4 in advance. In contrast, the controller 20, when determining that the estimated acceleration decrease amount is larger than the allowed acceleration decrease amount (Yes in step S15), proceeds to step S16.

In step S16, the controller 20 reduces the output torque of the motor 4 so that the estimated acceleration decrease amount is less than or equal to the allowed acceleration decrease amount. Specifically, the controller 20 reduces the output torque of the motor 4 so that the moving-direction acceleration of the hybrid vehicle 1 is reduced by an amount corresponding to a difference between the estimated acceleration decrease amount and the allowed acceleration decrease amount. For example, when the estimated acceleration decrease amount is 0.03 G and the allowed acceleration decrease amount is 0.02 G, the difference (that is, the excess of the estimated acceleration decrease amount) is 0.01 G. In this case, torque corresponding to this difference of 0.01 G is 10 Nm, and thus the controller 20 reduces the output torque of the motor 4 by 10 Nm. Then, the controller 20 proceeds to step S17.

In step S17, the controller 20 executes the engine start control. After the engine 2 is started by the engine start control, the controller 20 ends the traveling mode switching control.

Next, the engine start control according to the embodiment of the present disclosure will be described with reference to FIG. 4. The engine start control is executed in step S17 of FIG. 3.

When the engine start control is started, in step S21, the controller 20 sets torque which should be applied to the second clutch CL2 when the second clutch CL2 is brought into the slip state during start-up of the engine (hereinafter referred to as "second clutch target slip torque"). Specifically, the controller 20 obtains the second clutch target slip torque based on the gear stage currently set in the transmission 6 and the current torque of the motor 4. Here, minimum torque which can be applied to the second clutch CL2 in the slip state (hereinafter referred to as "second clutch minimum torque") is determined according to the gear stage. Accordingly, as a typical example, the controller 20 obtains the second clutch minimum torque according to the current gear stage based on a relationship between the gear stage and the second clutch minimum torque (a map defined in advance or the like) to set the second clutch minimum torque as the second clutch target slip torque.

It should be noted that the reason why the second clutch minimum torque depends on the gear stage of the transmission 6 is because as described above, the second clutch CL2 corresponds to a number of clutches for switching various gear stages in the transmission 6. That is, this is because the clutches forming the second clutch CL2 change according to the gear stage, and accordingly minimum slip torque of the second clutch CL2 also changes.

Subsequently, in step S22, the controller 20 controls the second clutch CL2 so that the second clutch CL2 is gradually shifted to the slip state. Specifically, the controller 20 shifts the second clutch CL2 in the engaged state toward the released side until the torque of the second clutch CL2 reaches the second clutch target slip torque set in step S21. Then, the controller 20 holds the state of the second clutch CL2 (slip state) to which the second clutch target slip torque has been applied.

Subsequently, in step S23, the controller 20 controls the first clutch CL1 so that the first clutch CL1 is gradually shifted to a slip state. That is, the controller 20 shifts the first clutch CL1 in the released state toward the engaged side. For example, the controller 20 shifts the first clutch CL1 to a predetermined slip state before a completely engaged state. Furthermore, the controller 20 thus shifts the first clutch CL1 to the slip state to transmit the torque of the motor 4 to the engine 2 side via the first clutch CL1, so that the torque of the motor 4 cranks the engine 2, increasing the engine rotation speed. In this case, the controller 20 performs control for gradually increasing the torque of the motor 4 in a state where the rotation speed of the motor 4 is almost maintained. Typically, the controller 20 increases the torque of the motor 4 to maximum torque which can be output at the current rotation speed. Thereafter, torque to be transmitted to the engine 2 side (that is, torque to be given to the first clutch CL1) reaches the torque necessary for start of the engine 2, while the controller 20 holds the first clutch CL1 in the predetermined slip state until a timing at which the engine 2 should be ignited comes.

Subsequently, in step S24, when the timing at which the engine 2 can be ignited comes, the controller 20 controls the engine 2 so that the engine 2 is ignited. That is, the controller 20 executes ignition using the spark plug to thereby combust an air-fuel mixture in the engine 2. Then, in step S25, the controller 20 controls the first clutch CL1 so that the first clutch CL1 in the slip state is completely engaged. Specifically, the controller 20 completely engages the first clutch CL1 at a timing at which the engine rotation speed and the motor rotation speed almost coincide with each other. Then, in step S26, the controller 20 controls the second clutch CL2 so that the second clutch CL2 in the slip state is completely engaged. Specifically, the controller 20 completely engages the second clutch CL2 at a timing at which the engine rotation speed (coinciding with the motor rotation speed) and a rotation speed obtained by gear-ratio conversion of the vehicle speed coincide with each other. Then, the controller 20 ends the engine start control.

Operations and Effects

Next, operations and effects of the control apparatus for the hybrid vehicle according to the embodiment of the present disclosure will be described.

Figure 5:
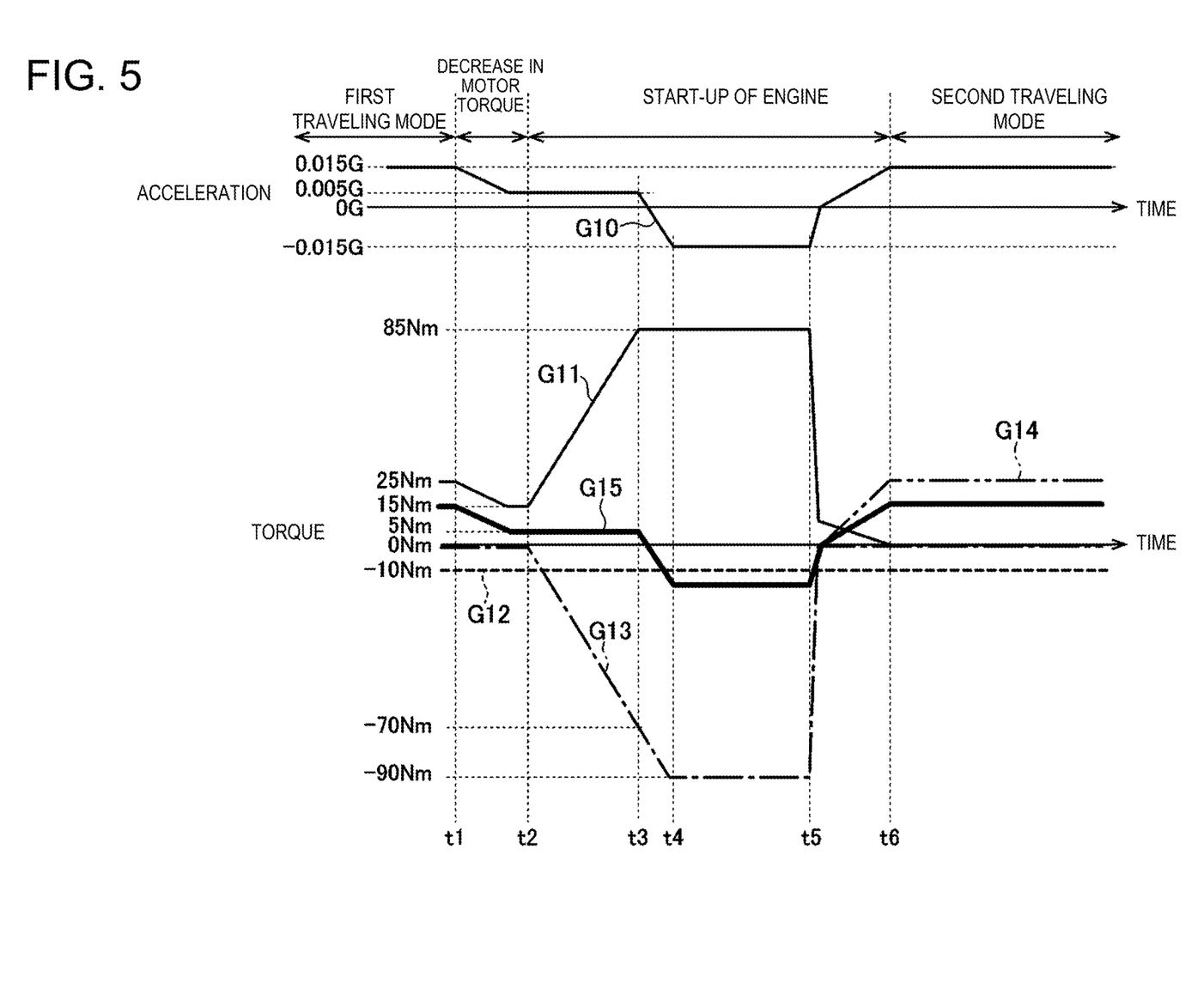
FIG. 5 illustrates an example of a time chart in the case where control of the hybrid vehicle according to the embodiment of the present disclosure is executed.
Figure 6:
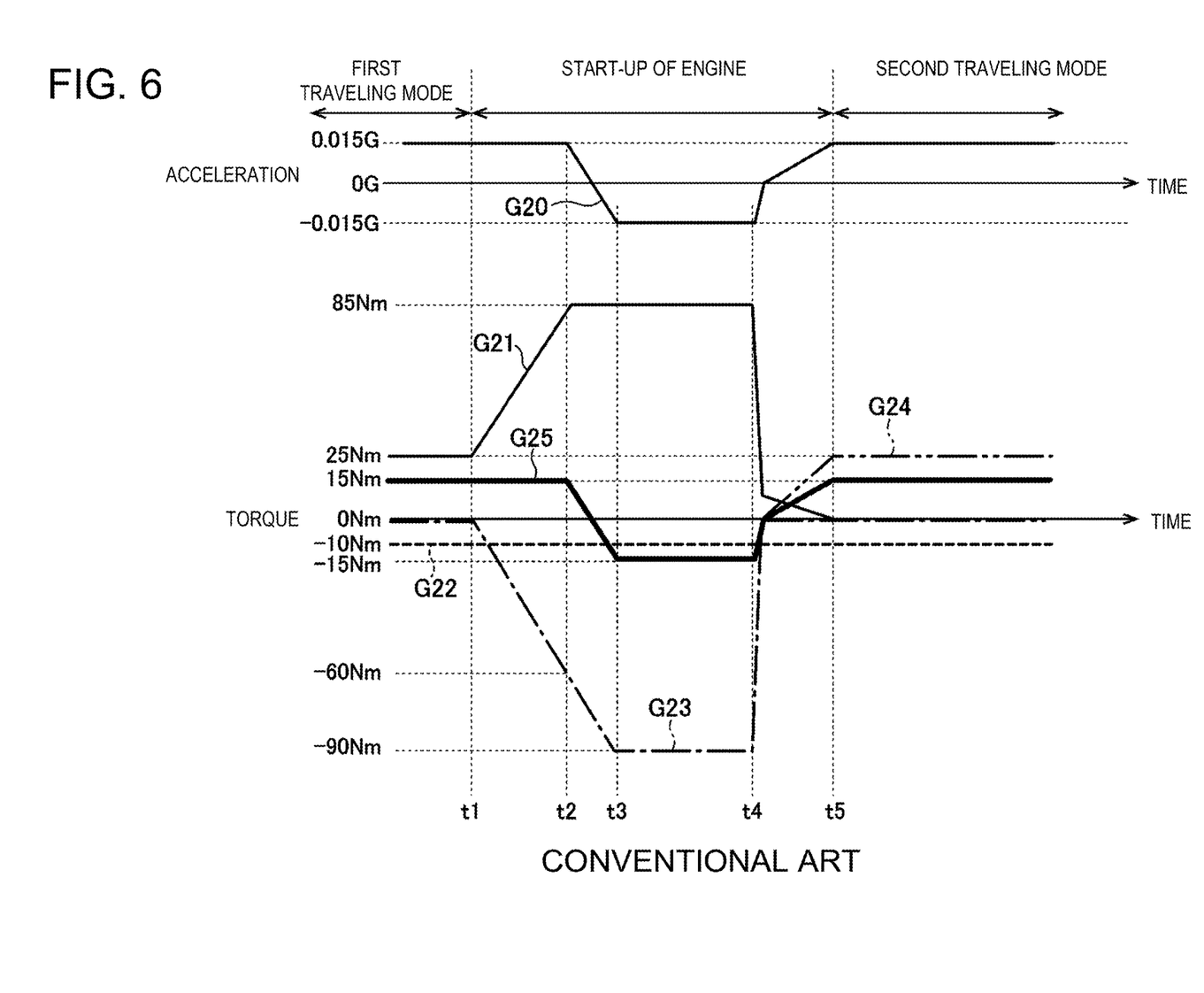
FIG. 6 illustrates an example of a time chart in the case where control of the hybrid vehicle is executed by a conventional technique.

FIG. 5 illustrates an example of a time chart in the case where control of the hybrid vehicle 1 according to the embodiment of the present disclosure is executed. FIG. 6 illustrates an example of a time chart in the case where switching of the traveling mode is executed by the conventional technique. In FIGS. 5 and 6, the upper time chart illustrates a time change in acceleration (including deceleration) of the hybrid vehicle 1, and the lower time chart illustrates torque of the motor 4, the engine 2, and the like (specifically, torque in an output shaft of the motor 4).

Here, to describe operations and configurations of the traveling mode switching control according to the present embodiment, results in the case where the traveling mode switching control according to the present embodiment is performed are illustrated in FIG. 5, and results in the case where switching of the traveling mode is executed by the conventional technique are illustrated in FIG. 6 as a comparative example. Each of the graphs in FIGS. 5 and 6 illustrates time changes in the following parameters.

Graph G10: Acceleration of the hybrid vehicle 1
Graph G11: Output torque of the motor 4
Graph G12: Torque necessary for canceling traveling resistance (negative value)
Graph G13: Torque necessary for start of the engine 2 (negative value)
Graph G14: Output torque of the engine 2 after start
Graph G15: Torque balance (the total value of G11 to G14)
Graph G20: Acceleration of the hybrid vehicle 1
Graph G21: Output torque of the motor 4
Graph G22: Torque necessary for canceling traveling resistance (negative value)
Graph G23: Torque necessary for start of the engine 2 (negative value)
Graph G24: Output torque of the engine 2 after start
Graph G25: Torque balance (the total value of G21 to G24)

In the example of the conventional technique illustrated in FIG. 6, from before a time t1 in which the hybrid vehicle 1 is traveling in the first traveling mode to after a time t5 in which the hybrid vehicle 1 is traveling in the second traveling mode, the torque necessary for canceling the traveling resistance is constant at −10 Nm (see graph G22). Furthermore, before the time t1, the output torque of the motor 4 is 25 Nm (see graph G21). Accordingly, the torque balance is 15 Nm (see graph G25), and the acceleration of the hybrid vehicle 1 corresponding to this torque balance is 0.015 G (see graph G20).

In the example of the conventional technique of FIG. 6, at the time t1, when it is determined that the request for switching from the first traveling mode to the second traveling mode is present, the engine start control is started immediately. Then, between the time t1 and a time t3, the magnitude of the torque necessary for start of the engine 2 increases to 90 Nm (see graph G23 in which the torque necessary for start of the engine 2 is represented as a negative value and thus decreases on the graph). Between the time t1 and a time t2, the output torque of the motor 4 also increases according to the increase in the torque necessary for start of the engine 2 (see graph G21), and thus the torque balance is kept constant at 15 Nm (see graph G25). That is, no change occurs in the acceleration of the hybrid vehicle 1. However, after the output torque of the motor 4 reaches the maximum value of 85 Nm at the time t2, the output torque of the motor 4 does not increase. Accordingly, between the time t2 and the time t3, the torque balance decreases according to the increase in the torque necessary for start of the engine 2 (see graph G25). Then, when the magnitude of the torque necessary for start of the engine 2 reaches the maximum value of 90 Nm at the time t3, the torque balance is 85−10−90=−15 Nm (see graph G25). The acceleration of the hybrid vehicle 1 corresponding to this torque balance is −0.015 G (see graph G20). Accordingly, the acceleration decrease amount from the acceleration of 0.015 G at the time t1 at which the engine start control is started is 0.03 G. That is, in the conventional technique exemplified in FIG. 6, the decrease amount of the moving-direction acceleration of the hybrid vehicle 1 during the engine start control exceeds 0.02 G which is the allowed acceleration decrease amount in which the driver is not caused discomfort, and thus the driver may be caused discomfort.

On the other hand, also in the present embodiment exemplified in FIG. 5, from before the time t1 in which the hybrid vehicle 1 is traveling in the first traveling mode to after a time t6 in which the hybrid vehicle 1 is traveling in the second traveling mode, the torque necessary for canceling the traveling resistance is constant at −10 Nm (see graph G12). Furthermore, before the time t1, the output torque of the motor 4 is 25 Nm (see graph G11). Accordingly, the torque balance before the time t1 is 15 Nm (see graph G15), and the acceleration of the hybrid vehicle 1 corresponding to this torque balance is 0.015 G (see graph G10).

Also in the example of the present embodiment of FIG. 5, similarly to the example of the conventional technique illustrated in FIG. 6, at the time t1, it is determined that the request for switching from the first traveling mode to the second traveling mode is present. However, as in the example of the conventional technique, when the engine start control is immediately started at the time t1, the decrease amount of the moving-direction acceleration of the hybrid vehicle 1 during the engine start control reaches 0.03 G, which may cause driver discomfort. Thus, in the example of the present embodiment of FIG. 5, the controller 20, before executing the engine start control, between the times t1 and t2, reduces the output torque of the motor 4 by the predetermined amount. In the example of FIG. 5, the estimated acceleration decrease amount is 0.03 G and the allowed acceleration decrease amount is 0.02 G, and thus the difference (that is, the excess of the estimated acceleration decrease amount) is 0.01 G. That is, the torque corresponding to this difference of 0.01 G is 10 Nm, and thus the controller 20, between the times t1 and t2, reduces the output torque of the motor 4 by 10 Nm so as to be 15 Nm (see G11). Thus, the torque balance at the time t2 is 15−10=5 Nm, and the acceleration of the hybrid vehicle 1 corresponding to this torque balance is 0.005 G (see graph G10).

Thereafter, between the time t2 and a time t4, the magnitude of the torque necessary for start of the engine 2 increases to 90 Nm (see graph G13 in which the torque necessary for start of the engine 2 is represented as a negative value and thus decreases on the graph). Between the time t2 and the time t3, the output torque of the motor 4 also increases according to the increase in the torque necessary for start of the engine 2 (see graph G11), and thus the torque balance is kept constant at 5 Nm (see graph G15). That is, no change occurs in the acceleration of the hybrid vehicle 1. However, after the output torque of the motor 4 reaches the maximum value of 85 Nm at the time t3, the output torque of the motor 4 does not increase. Accordingly, between the time t3 and the time t4, the torque balance decreases according to the increase in the torque necessary for start of the engine 2 (see graph G15). Then, when the magnitude of the torque necessary for start of the engine 2 reaches the maximum value of 90 Nm at the time t4, the torque balance is 85−10−90=−15 Nm (see graph G15). The acceleration of the hybrid vehicle 1 corresponding to this torque balance is −0.015 G (see graph G10). Accordingly, the acceleration decrease amount from the acceleration of 0.005 G at the time t2 at which the engine start control is started is 0.02 G. That is, in the example of the present embodiment illustrated in FIG. 5, the decrease amount of the moving-direction acceleration of the hybrid vehicle 1 during the engine start control is less than or equal to 0.02 G which is the allowed acceleration decrease amount in which the driver is not caused discomfort, and thus it is possible to suppress a sense of discomfort in the driver.

After the time t4, the engine 2 is ignited at the time t5, and thereafter, by the time t6, the first clutch CL1 and the second clutch CL2 are completely engaged, switching the traveling mode of the hybrid vehicle 1 to the second traveling mode at the time t6.

As described above, in the present embodiment, the controller 20, at the time of switching from the first traveling mode to the second traveling mode, performs the control to reduce the output torque of the motor 4 by the predetermined amount, and thereafter the controller 20 shifts the first clutch CL1 from the released state to the engaged state and starts the engine 2 by cranking the engine 2 using the motor 4. That is, in the present embodiment, the controller 20, at the time of switching from the first traveling mode to the second traveling mode, before the engine 2 is started, performs the control to reduce the output torque of the motor 4 by the predetermined amount to reduce the moving-direction acceleration of the hybrid vehicle 1 by the predetermined amount in advance.

Thus, when the engine 2 is started for switching of the traveling mode, even if the motor 4 cannot sufficiently generate the torque necessary for starting the engine 2, it is possible to reduce the acceleration change when the moving-direction acceleration of the hybrid vehicle 1 decreases to the deceleration corresponding to the insufficient amount of the output torque of the motor 4. Thus, at the time of start of the engine 2 in association with switching from the first traveling mode to the second traveling mode, it becomes possible to suppress a sense of discomfort in the driver as if the hybrid vehicle 1 were suddenly dragged backward.

Furthermore, according to the present embodiment, even at the time of switching from the first traveling mode to the second traveling mode, if the operation performed by the driver for movement of the hybrid vehicle 1 is present, the controller 20 does not perform the control to reduce the output torque of the motor 4 by the predetermined amount. Thus, the engine 2 is started quickly, and the request from the driver for movement of the hybrid vehicle 1 can be realized appropriately.

Furthermore, the present embodiment is applied to the hybrid vehicle 1 including the transmission 6 (automatic transmission) including the planetary gear. In the transmission 6 (automatic transmission) including the planetary gear, inertia is large, and thus the decrease in the moving-direction acceleration at the time of switching of the traveling mode as described above is easily generated. However, according to the present embodiment, before the engine 2 is started, the control to reduce the output torque of the motor 4 by the predetermined amount is performed to reduce the moving-direction acceleration of the hybrid vehicle 1 by the predetermined amount in advance, so that even if the motor 4 cannot sufficiently generate the torque necessary for starting the engine 2 and increasing the revolution speed of the planetary gear in the transmission 6, it is possible to reduce the acceleration change when the moving-direction acceleration decreases to the deceleration corresponding to the insufficient amount of the output torque of the motor 4. Thus, at the time of switching from the first traveling mode to the second traveling mode, it becomes possible to suppress a sense of discomfort in the driver as if the hybrid vehicle 1 were suddenly dragged backward.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims. Further, if used herein, a phrase of "and/or" means either or both of two stated possibilities.

REFERENCE CHARACTERS LIST 1 hybrid vehicle
2 engine
4 motor
6 transmission
12 drive wheel
20 controller
20a processor
20b memory
CL1 first clutch
CL2 second clutch
P1 pinion gear

The invention claimed is:

1. A control apparatus for a hybrid vehicle including an engine, a motor, and a clutch that switches between transmission and non-transmission of torque between the engine and the motor, the control apparatus comprising:
  a processor configured to execute:
    a traveling mode determination module for determining whether or not to switch a traveling mode of the hybrid vehicle from a first traveling mode in which the clutch is set to a released state and the hybrid vehicle is caused to travel using torque of the motor without using torque of the engine to a second traveling mode in which the clutch is set to an engaged state and the hybrid vehicle is caused to travel using at least the torque of the engine;
    a motor control module for performing a control to reduce output torque of the motor by a predetermined amount when the traveling mode determination module determines that the traveling mode of the hybrid vehicle is to be switched from the first traveling mode to the second traveling mode;
    a clutch control module for shifting the clutch from the released state to the engaged state so that the torque of the motor is transmitted to the engine via the clutch after the control performed by the motor control module; and
    a cranking control module for cranking the engine using the motor to start the engine during and/or after the shifting performed by the clutch control module, wherein
  when the traveling mode determination module determines that the traveling mode of the hybrid vehicle is to be switched from the first traveling mode to the second traveling mode:
    if a change amount of an accelerator opening detected by an accelerator opening sensor is greater than or equal to a predetermined amount, the motor control module does not perform the control to reduce the output torque of the motor by the predetermined amount; and
    if the change amount of the accelerator opening is less than the predetermined amount, the motor control module performs the control to reduce the output torque of the motor by the predetermined amount.

2. The control apparatus for the hybrid vehicle according to claim 1, wherein the hybrid vehicle further comprises an automatic transmission that is provided on a motive power transmitting path between the engine and the motor, and a drive wheel, and that comprises a planetary gear.

3. A control apparatus for a hybrid vehicle including an engine, a motor, and a clutch that switches between transmission and non-transmission of torque between the engine and the motor, the control apparatus comprising:
  a processor configured to execute:

a traveling mode determination module for determining whether or not to switch a traveling mode of the hybrid vehicle from a first traveling mode in which the clutch is set to a released state and the hybrid vehicle is caused to travel using torque of the motor without using torque of the engine to a second traveling mode in which the clutch is set to an engaged state and the hybrid vehicle is caused to travel using at least the torque of the engine;

a motor control module for performing a control to reduce output torque of the motor so that a moving-direction acceleration of the hybrid vehicle is reduced by a predetermined amount when the traveling mode determination module determines that the traveling mode of the hybrid vehicle is to be switched from the first traveling mode to the second traveling mode;

a clutch control module for shifting the clutch from the released state to the engaged state so that the torque of the motor is transmitted to the engine via the clutch after the control performed by the motor control module; and a cranking control module for cranking the engine using the motor to start the engine during and/or after the shifting performed by the clutch control module, wherein when the traveling mode determination module determines that the traveling mode of the hybrid vehicle is to be switched from the first traveling mode to the second traveling mode:

if a change amount of an accelerator opening detected by an accelerator opening sensor is greater than or equal to a predetermined amount, the motor control module does not perform the control to reduce the output torque of the motor; and if the change amount of the accelerator opening is less than the predetermined amount, the motor control module performs the control to reduce the output torque of the motor.

4. The control apparatus for the hybrid vehicle according to claim 1, wherein the hybrid vehicle further comprises an automatic transmission that is provided on a motive power transmitting path between the engine and the motor, and a drive wheel, and that comprises a planetary gear.

5. The control apparatus for the hybrid vehicle according to claim 1, wherein the traveling mode determination module determines that the request for switching to the second traveling mode is present, when a state of charge (SOC) of a battery detected by a SOC sensor is less than a predetermined value.

6. The control apparatus for the hybrid vehicle according to claim 1, wherein the traveling mode determination module determines that the request for switching to the second traveling mode is present, when an acceleration request from the driver is greater than a predetermined value.

7. The control apparatus for the hybrid vehicle according to claim 1, wherein, when an operation of a brake pedal is detected by a brake pedal sensor, when a gear-shifting instruction operation through a shift lever or a paddle shift is detected, when a steering wheel is operated, or when a sport mode switch is operated, the motor control module does not perform the control to reduce the output torque of the motor by the predetermined amount.

8. The control apparatus for the hybrid vehicle according to claim 1, wherein, when a sport mode is turned on by a sport mode switch, the motor control module does not perform the control to reduce the output torque of the motor by the predetermined amount.

9. The control apparatus for the hybrid vehicle according to claim 5, wherein, when an operation of a brake pedal is detected by a brake pedal sensor, when a gear-shifting instruction operation through a shift lever or a paddle shift is detected, when a steering wheel is operated, and when a sport mode switch is operated, the motor control module does not perform the control to reduce the output torque of the motor by the predetermined amount.

10. The control apparatus for the hybrid vehicle according to claim 5, wherein, when a sport mode is turned on by a sport mode switch, the motor control module does not perform the control to reduce the output torque of the motor by the predetermined amount.

11. The control apparatus for the hybrid vehicle according to claim 3, wherein, when an operation of a brake pedal is detected by a brake pedal sensor, when a gear-shifting instruction operation through a shift lever or a paddle shift is detected, when a steering wheel is operated, and when a sport mode switch is operated, the motor control module does not perform the control to reduce the output torque of the motor.

12. The control apparatus for the hybrid vehicle according to claim 3, wherein, when a sport mode is turned on by a sport mode switch, the motor control module does not perform the control to reduce the output torque of the motor.

13. The control apparatus for the hybrid vehicle according to claim 1, wherein, when the traveling mode determination module determines that the traveling mode of the hybrid vehicle is to be switched from the first traveling mode to the second traveling mode, if an acceleration change when a moving-direction acceleration decreases to a deceleration level corresponding to an insufficient amount of the output torque of the motor is less than or equal to a predetermined amount, the motor control module does not perform the control to reduce the output torque of the motor.

14. The control apparatus for the hybrid vehicle according to claim 3, wherein, when the traveling mode determination module determines that the traveling mode of the hybrid vehicle is to be switched from the first traveling mode to the second traveling mode, if an acceleration change when a moving-direction acceleration decreases to a deceleration level corresponding to an insufficient amount of the output torque of the motor is less than or equal to a predetermined amount, the motor control module does not perform the control to reduce the output torque of the motor.

* * * * *